Dec. 21, 1954  J. W. MECORNEY ET AL  2,697,730
METHOD FOR PRODUCING HIGHER KETONES
Filed Nov. 24, 1951
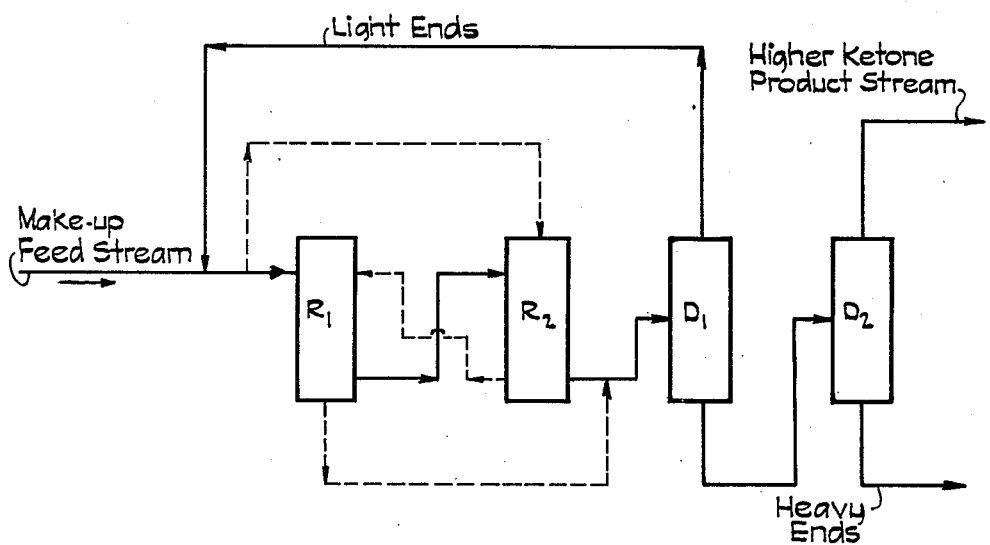
Inventors:
John W. Mecorney
George Walter Gaertner, Jr.
By
Their Attorney

United States Patent Office 2,697,730
Patented Dec. 21, 1954

2,697,730

METHOD FOR PRODUCING HIGHER KETONES

John W. Mecorney, Richmond Annex, and George W. Gaertner, Jr., Oakland, Calif., assignors to Shell Development Company, Emeryville, Calif., a corporation of Delaware Application November 24, 1951, Serial No. 258,024

19 Claims. (Cl. 260—593)

This invention is directed to a method for producing ketones by reacting an alcohol with a ketone in the presence of a catalyst, the ketones so produced being referred to as "higher ketones" since they contain a greater number of carbon atoms than the starting (lower) ketones.

It is known that higher ketones can be produced by reacting aliphatic alcohols and ketones in the presence of a catalyst having dehydrogenating and dehydrating characteristics, the reaction proceeding at elevated temperatures and at atmospheric or higher pressures. A representative reaction is that which occurs between methyl ethyl ketone and secondary butyl alcohol, as indicated in the following equation:

$$CH_3 \cdot CO \cdot C_2H_5 + CH_3 \cdot CH(OH) \cdot CH_2 \cdot CH_3 \rightarrow$$
$$CH_3 \cdot CH_2 \cdot CH(CH_3) \cdot CH_2 \cdot CO \cdot C_2H_5 + H_2O$$

In the foregoing reaction the principal ketone product is the 5-methyl-3-heptanone shown, though some 3,4-dimethyl-2-hexanone is formed. Small amounts of the corresponding $C_8$ alcohols 5-methyl-3-heptanol and 3,4-dimethyl-2-hexanol are also produced. An equilibrium is rapidly formed over the catalyst between the alcohol reactant and the ketone formed on dehydrogenation of the alcohol, as well as between the ketone reactant and the alcohol formed on hydrogenation of the ketone reactant. Accordingly, in many cases it is possible to operate using only alcohol or only ketone (together with hydrogen) as the feed component, the ketone product in such cases always containing twice the number of carbon atoms as the starting reactant. However, since the higher ketone product is largely formed by way of reaction between an alcohol and a (lower) ketone, whereby there is formed a product having a number of carbon atoms equal to the sum of the number present in the respective alcohol and ketone reactants, the present invention will generally be described as one involving a reaction between an alcohol and a ketone.

A wide variety of catalysts have heretofore been employed in carrying out reactions of the type described above, though all contain one or more components having dehydrating action and one or more components having a dehydrogenating action. Mixed catalysts of this type are well known, and include those wherein the dehydrating component comprises an oxide, hydroxide, carbonate or other salt of such metal as magnesium, aluminum, beryllium, barium, cadmium, zirconium, cerium, or thorium, for example, while the dehydrogenating portion of the catalyst is made up of copper, silver, chromium, manganese, nickel, tungsten, cobalt, iron, cadmium, uranium, thorium, tin or zinc, or of mixtures of such metals, either as such or in the form of their oxides, hydroxides, or salts with organic or inorganic acids. Thus, one mixed catalyst which has given good results is obtained by impregnating activated alumina (the dehydrating component) with a solution of a copper salt, or with both a copper and a zinc, manganese or iron salt, with the impregnated material being roasted and the copper oxide so formed then being reduced to copper in an atmosphere of hydrogen.

The mixed catalysts described above vary somewhat in activity, as determined by the total amount of reactants converted to the various product compounds, as well as in selectivity, as measured by the yield of the desired higher ketones which are formed. The conversion and yield are also affected by the nature and proportion of the reactants, as well as by the conditions of the reaction. However, for any given conversion level, it heretofore has been impossible to obtain yields in excess of about 75 to 85%, and in many cases the yield is but 50% or less. As employed therein, the term "conversion" refers to the total percentage of the alcohol and ketone reactants which is converted to all of the various products which are formed during the reaction. However, in determining the amount of such products formed, only those organic products having a carbon chain length greater than that of either of the reactants were taken into account, and the amounts of water and of any lower alcohols and ketones formed during the reaction (e. g., by dehydrogenation of the alcoholic reactant) were ignored. Accordingly, the conversion figures expressed herein are uniformly somewhat lower than the real conversion values. The term "yield" is employed to designate the percentage of said converted portion which goes to the indicated product compound.

It is an object of this invention to provide a method for increasing the yield of higher ketone products obtained by reacting an aliphatic alcohol with a (lower) aliphatic ketone. A particular object is to provide a method for obtaining an increase in the yield $C_8$ ketones formed on reacting a $C_4$ alcohol with a $C_4$ ketone. The nature of still other objects of the invention will be clear from a consideration of the descriptive portion to follow.

It is our discovery that in a process wherein higher ketones are formed by reacting an aliphatic (lower) ketone with an aliphatic alcohol, the yield of the desired higher ketone product can be appreciably increased by first passing the vaporous reaction mixture through a mixed dehydrogenating-dehydrating catalyst at an elevated temperature, preferably one between 240° C. and 300° C., and at a relatively higher pressure (i. e., 175 p. s. i. g. or higher), and then passing the reaction mixture from this mixed catalyst through a dehydrogenating catalyst at a relatively low pressure (i. e., one between about 15 and 50 p. s. i. g.) and an elevated temperature, preferably one above about 225° C. By conducting the operation in this fashion, the yield of the desired higher ketone product can be increased by at least 10%. When temperatures appreciably outside the 240° C. to 300° C. range and pressures substantially below 175 p. s. i. g. are employed in the first step, the conversion obtained falls off quite sharply, as does the period of active catalyst life. Again, when higher pressures are used during the second step of the process, the gaseous effluent from the first reaction zone passes through the second zone substantially unchanged, and the yield of higher ketones in the gaseous product stream is not increased.

The catalyst which is employed in the second, or low pressure step can be one having only dehydrogenating characteristics, or it may be a mixed catalyst as, for example, one of the type described above which has both dehydrogenating as well as dehydrating characteristics. Thus, the dehydrogenating catalyst can be made up of one or more of such metals such as copper, silver, chromium, manganese, nickel, tungsten, cobalt, iron, cadmium, magnesium, uranium, thorium, lead, tin or zinc, or it can be made up of one or more of the oxides, hydroxides, or salts of said metals either with or without any metallic component. For example, metallic copper gives excellent results, as do mixtures of copper with difficultly reducible metal oxides such as zinc oxide, manganese oxide, or magnesium oxide, for example. However, since it is possible to employ any type of a mixed catalyst providing the same has dehydrogenating characteristics, it is preferable to employ the same catalyst in both the high as well as the low pressure steps of the present process. Surprisingly, it was found that mixed dehydrating-dehydrogenating catalysts whose activity has been so reduced as to make their further use impractical in the first, or high pressure step of the process without a regeneration treatment can be used with excellent results in the second, or low pressure step of the process, and are even superior for this purpose to the more active catalyst used in the first step. Accordingly, the process of the present invention can thus be conducted with good results by first passing the gaseous reaction mixture through a mixed dehydrating-dehydrogenating catalyst of high activity and then passing the gaseous product so obtained through a bed of the same catalyst which can be one whose activity as a catalyst for the high pressure step of the process has been greatly reduced as a result of previous usage under high pressure conditions.

One system which is suitable for carrying out the process of the present invention is illustrated in the figure of the drawing. The flow diagram there presented represents a continuous system wherein a combined light ends recycle stream and a make-up feed stream is fed first through a reactor $R_1$ and then through a reactor $R_2$, or alternately, through the reactor $R_2$ and then through the reactor $R_1$, with the effluent from the second reactor in either case then being passed into a first distillation column $D_1$ where the light ends are separated out, and then into a second distilling column $D_2$ which separates the desired higher ketone products from the small amounts of higher boiling materials present which are removed as bottoms. In this system it is contemplated that a catalyst of the same composition will be employed in each of the reactors $R_1$ and $R_2$, though once the system is in operation, the catalyst in one or the other of the reactors will be relatively inactive as regards the first, or high pressure step of the process. Thus, as indicated by the solid flow lines, the combined light ends and make-up feed stream can be passed at a temperature between 240° C. and 300° C. and at a pressure above 175 p. s. i. g. first through the catalyst in reactor $R_1$ and then, still at elevated temperatures and at as low a pressure as practical (i. e., from about 15 to 50 p. s. i. g.), through the catalyst in the reactor $R_2$. The effluent from $R_2$ is then passed into the distilling columns $D_1$ and $D_2$. This operating sequence can be observed until the catalyst in $R_1$ gives evidence of becoming exhausted, at which point the unit can be shut down while the catalyst in $R_2$ is either regenerated in situ or is replaced by fresh catalyst. On again starting up the unit, the gaseous feed stream is then passed, via the conduit shown in dotted line, first through the now-active catalyst in reactor $R_2$ at a pressure above 175 p. s. i. g. and at a temperature between 245 and 300° C., and then at low pressure through the catalyst of reduced activity in reactor $R_1$, with the effluent from $R_1$ now flowing into the distillation columns $D_1$ and $D_2$. As the catalyst in $R_2$ thereafter becomes exhausted, the flow of gases is again reversed, with the catalyst in reactor $R_1$ being regenerated in preparation for the next cycle of operation. This method of operation has the advantage not only of increasing the yield of the desired higher ketone products, but also of extending the useful life of a given body of catalyst without decreasing the over-all output of a given reactor unit.

The effluent from the first-encountered of the reactors $R_1$ or $R_2$ can, if desired, be passed through a gas-liquid separator (not shown) and the non-condensable hydrogen and other gases so separated being vented from the system before the condensed portions of the effluent are again heated and passed as a vapor into the second reactor.

Again, the light ends recycle stream from $D_1$ can be passed through a suitable dehydration column (not shown) before the resulting water-free gases are combined with the make-up feed stream and fed to the reactors.

The reactant proportions which should be employed in carrying out the process of the present invention are not critical. In fact, when the ketone product to be formed is one which is produced by reacting a (secondary) aliphatic alcohol with an aliphatic ketone reactant having the same number of carbon atoms as the alcohol (as in the case with methyl ethyl ketone and secondary butyl alcohol, for example) it is possible to operate using only alcohol, or a mixture of ketone and hydrogen, as the feed. This is due to the fact, as noted above, that an equilibrium between the alcohol formed on dehydrogenation of the alcohol reactant is quickly established over the mixed catalyst under the prevailing reaction conditions. In those cases where the higher ketone is formed by combining an alcohol with a ketone which does not have the same number of carbon atoms as the alcohol, it is only necessary to maintain a feed stream whose components have the desired carbon number ratio without regard to whether these components are alcohols or ketones. Thus, in a process nominally based on reacting isopropyl alcohol (a $C_3$ compound) with methyl ethyl ketone (a $C_4$ compound) to produce a $C_7$ ketone, there can be employed any desired admixture of the $C_3$ compounds (isopropyl alcohol and acetone) with the $C_4$ compounds (methyl ethyl ketone and secondary butyl alcohol) which will give a ratio of approximately 0.2 to 5 moles (and preferably 0.2–0.5 mole) of the $C_3$ compound for each mole of the $C_4$ compound. In plant operations, any unconverted alcohol and/or lower ketone components of the reactor effluent are recycled back to the reactor. Thus, in those cases where this recycle stream has a different carbon number ratio than the desired feed composition, it is only necessary to add a make-up component to the recycle stream which will reestablish the desired carbon number ratio. For example, in the case where $C_3$ and $C_4$ reactants are combined to produce a $C_7$ ketone, if the recycle stream is deficient in $C_3$ component the same can be supplied either as isopropyl alcohol or as acetone. Again, if the $C_4$ component is deficient, this can be remedied by adding secondary butyl alcohol or methyl ethyl ketone. It should be remembered however, that in all cases where the feed is unduly rich in ketones it may be necessary to add hydrogen to preserve the desired ketone-alcohol equilibrium over the catalyst.

If desired, the process of this invention can also be operated by feeding a mixture of alcoholic or ketonic reactants, whereby there are simultaneously produced a variety of higher ketone reaction products. Thus, the high pressure reactor can be supplied with a mixture of isopropyl and secondary butyl alcohols (this mixture constituting the make-up feed stream in a cyclic, continuous operation of the type shown in the drawing), whereby there are simultaneously produced $C_6$, $C_7$, $C_8$, $C_9$ and higher ketones in addition to $C_3$ and $C_4$ ketones which are normally recycled back to the reactor after being separated from the higher ketone and other higher boiling reaction products formed during the reaction.

The rate at which the vaporous mixture of the alcohol and/or ketone reactants (optionally with hydrogen and/or a diluent gas) in the desired molar proportions is passed through the catalyst beds is not critical. Thus, good results can be obtained at an LHSV of from about 0.5 to 8, though a preferred LHSV is from about 1 to 4. The term "LHSV" here represents "liquid hourly space velocity" and designates the number of volumes of the feed mixture (measured in the liquid condition) which are passed through a given body of catalyst per hour, per nominal volume of catalyst.

The process of the present invention is illustrated in various of its embodiments by the following examples:

*Example I*

In this operation there was employed a catalyst prepared by impregnating activated alumina (F–1 Grade, a product of Aluminum Ore Company) with a concentrated aqueous solution of copper nitrate at about 80° C., the amount of copper nitrate solution employed being sufficient to provide approximately 10% copper, based on the weight of the dry catalyst. The excess water present was then evaporated and the product dried at 125° C. for 3 hours, following which the dry material was roasted at 425° C. in a stream of dry air for a further period of 4 hours. The roasted catalyst material was then reduced in a stream of pure hydrogen gas at a temperature of 250° C. for four hours, after which the catalyst was divided into equal portions and placed in two steel reactor tubes connected in series. A mixture of methyl ethyl ketone and secondary butyl alcohol in substantially equi-molar proportions was then vaporized and passed at a LHSV of 2, a temperature of 255° C. and a pressure of 250 p. s. i. g., through the catalyst in the first reactor tube, and then at approximately the same temperature and flow rate, but at a pressure of about 30 p. s. i. g., through the second reactor tube. By sampling the effluent from the first reactor, it was found that the conversion was approximately 50% and the yield of $C_8$ ketone (which consisted of about 95% 5-methyl-3-heptanone and about 5% 3,4-dimethyl-3-hexanone) was about 75% to 80%. However, it is found that the effluent from the second reactor contains a larger amount of $C_8$ ketone, the yield from this reactor being about 88% to 90% and the conversion remaining unchanged.

At the end of 400 hours of continuous operation, by which time the conversion has dropped to about 40%, the unit is shut down while the catalyst in the low pressure reactor (whose activity for the high pressure phase of the reaction has been somewhat reduced) is regenerated by burning with air at about 275° C., followed by reduction with hydrogen at about 250° C. for several hours. The flow of gases is then reversed, with the feed now being fed first through the regenerated catalyst at a pressure of 175 p. s. i. g. and a temperature of 255° C. and then through the now-deactivated catalyst in the other reactor at approximately the same temperature, though at the greatly reduced pressure of about 30 p. s. i. g. Analysis of the product gases from the respective reactors discloses that the conversion has again reached the level of approximately 50%, with the yield of $C_8$ ketones in the effluent from the first reactor being about 80% and from the second reactor about 90%. After the process is continued for another period of approximately 400 hours, the unit is shut down to permit regeneration of the catalyst in the low pressure reactor, with the flow of gases through the reactors again being reversed as the unit is once more placed in operation. The process can be continued in this fashion indefinitely.

Separation of the light ends from the effluent from the low pressure reactor in the operation described in the preceding paragraph can be effected by conventional methods, with the light ends of recovered being preferably dehydrated as they are recycled back into the high pressure reactor. Likewise, the desired higher ketone products can be separated from the effluent from the low pressure reactor by known separation methods.

Example II

In this operation there were employed the same reactants and operating conditions as described in the preceding example. Here, however, while the catalyst used in the high pressure reactor was the same as that employed in the foregoing example, the catalyst used in the low pressure reactor was one which had been prepared by impregnating small pellets of a calcined diatomaceous earth product with a solution of nickel nitrate in an amount sufficient to provide the pellets with approximately 10% nickel, based on the dry weight of the catalyst. The impregnated catalyst was then dried and roasted in air, following which the nickel oxide produced during roasting was reduced to nickel in an atmosphere of hydrogen. In this case the conversion, as determined from a study of the effluent from either the high or the low pressure reactor, is approximately 50%. However, the yield of $C_8$ ketone from the high pressure reactor is about 80%, while that from the low pressure reactor is approximately 90%. Since the nickel-containing catalyst is one having only dehydrogenating characteristics, the flow of feed gases through hte respective reactors cannot here be reversed. Instead the process is interrupted from time to time to permit reactivation of the catalyst in the respective reactors.

Example III

In this operation there were employed the same catalyst and reaction conditions as set forth in Example I above. Here, however, the feed stream was made up of equimolar parts of sec.-butyl alcohol and isopropyl alcohol, and among other products there were produced $C_6$, $C_7$, $C_8$ and higher ketones. In addition, there were formed $C_3$ and $C_4$ ketones produced by dehydrogenation of the respective alcoholic reactants, these lower ketones being separated from the effluent from the low pressure reactor, dehydrated, and recycled back into the high pressure reactor for admixture with the make-up $C_3$ and $C_4$ alcoholic reactants. The conversion in this operation, as determined from a study of the reactor effluent from either the high or the low pressure reactors, was from about 50% to 55%. However, the total yield of the $C_6$ and higher ketones in the effluent from the first, or high pressure reactor, was only about 50%, whereas that from the second, or low pressure reactor, was 90%.

The invention claimed is:

1. In a method for producing higher ketones, the steps comprising bringing an aliphatic alcohol into reactive engagement with an aliphatic ketone in the vapor phase and in the presence of a dehydrating-dehydrogenating catalyst at a pressure above 175 p. s. i. g. and at an elevated temperature, and then passing the vaporous reaction mixture so obtained through a dehydrogenating catalyst at a pressure between about 15 and 50 p. s. i. g. and at an elevated temperature whereby a ketone having a number of carbon atoms per molecule equal to the sum of the number present in the alcohol and ketone reactants is obtained.

2. The method of claim 1 wherein a dehydrogenating-dehydrating catalyst of substantially the same composition is employed in each of the steps.

3. In a method for producing higher ketones, the steps comprising bringing an aliphatic alcohol into reactive engagement with an aliphatic ketone in the vapor phase and in the presence of a copper-alumina dehydrating-dehydrogenating catalyst at a pressure above about 175 p. s. i. g. and at a temperature between about 240° C. and 300° C., and then passing the vaporous reaction mixture so obtained through a metal dehydrogenating catalyst at a pressure between about 15 and 50 p. s. i. g. and at a temperature above about 225° C. whereby a ketone having a number of carbon atoms per molecule equal to the sum of the number present in the alcohol and ketone reactants is obtained.

4. The method of claim 3 wherein a dehydrogenating-dehydrating catalyst of substantially the same composition is employed in each of the steps.

5. The method of claim 3 wherein the alcohol and ketone reactants each contain from 3 to 7 carbon atoms.

6. The method of claim 3 wherein the reactants comprise methyl ethyl ketone and secondary butyl alcohol.

7. In a method for continuously producing higher ketones, the steps comprising continuously reacting at least one component selected from the group consisting of an aliphatic alcohol, mixtures of an aliphatic alcohol with an aliphatic ketone, mixtures of an aliphatic alcohol with an aliphatic ketone and with hydrogen, and mixtures of an aliphatic ketone with hydrogen to produce a higher ketone therefrom, by passing a vaporous feed stream containing said component through a first reaction zone provided with a metal oxide-metal dehydrating-dehydrogenating catalyst at a pressure above about 175 p. s. i. g. and at an elevated temperature; continuously passing the effluent from said first zone through a second reaction zone provided with a metal dehydrogenating catalyst at a pressure between about 15 and 50 p. s. i. g. and at an elevated temperature; continuously passing the effluent from said second zone into a distillation column wherein said effluent is separated into a light ends fraction and a higher fraction containing the desired higher ketone products; and continuously recycling said light ends fraction back to the first reaction zone in admixture with the incoming feed stream.

8. The method of claim 7 wherein the incoming feed stream contains a mixture of methyl ethyl ketone and secondary butyl alcohol.

9. In a method for continuously producing higher ketones, the steps comprising continuously reacting an aliphatic alcohol to produce a higher ketone therefrom by passing a vaporous feed stream containing said alcohol through a first reaction zone provided with a dehydrating-dehydrogenating catalyst consisting essentially of at least one dehydration catalyst of the group consisting of oxides, hydroxides and carbonates of magnesium, aluminum, beryllium, barium, cadmium, zirconium, cerium and thorium together with at least one dehydrogenating catalyst of the group consisting of metallic copper, silver, chrominum, manganese, nickel, tungsten, cobalt, iron, cadmium, uranium, lead, tin and zinc and oxides and hydroxides thereof at a pressure above about 175 p. s. i. g. and at an elevated temperature; continuously passing the effluent from said first zone through a second reaction zone provided with a dehydrogenating catalyst at a pressure between about 15 and 50 p. s. i. g. and at an elevated temperature; continuously passing the effluent from said second zone into a distillation column wherein said effluent is separated into (1) a light ends fraction containing unreacted alcohol and a ketone obtained by dehydrogenating said alcohol, and (2) a higher boiling fraction containing the desired higher ketone products containing a number of carbon atoms per molecule equal to the sum of the number present in said alcohol and ketone; continuously recycling said light ends fraction back to the first reaction zone in admixture with the aliphatic alcohol-containing feed stream; and recovering the higher ketones from said higher boiling fraction.

10. The method of claim 9 wherein a dehydrating-dehydrogenating catalyst of substantially the same composition is employed in each of said reaction zones.

11. The method of claim 9 wherein the light ends fraction is dehydrated before being admixed with the aliphatic alcohol-containing feed stream.

12. The method of claim 9 wherein the incoming feed stream contains secondary butyl alcohol.

13. The method of claim 9 wherein the incoming feed stream contains a mixture of secondary butyl alcohol and isopropyl alcohol.

14. In a method for continuously producing higher ketones, the steps comprising continuously reacting at least one aliphatic alcohol to produce a higher ketone therefrom by passing a vaporous feed stream containing said alcohol through a first reaction zone provided with a copper-alumina dehydrogenating-dehydrating catalyst at a pressure above about 175 p. s. i. g. and at a temperature between about 240° C. and 300° C.; continuously passing the effluent from said first zone through a second reaction zone provided with a copper-alumina catalyst at a pressure between about 15 and 50 p. s. i. g. and at a temperature above about 225° C.; continuously passing the effluent from said second zone into a distillation column wherein the effluent is separated into (1) a light ends fraction containing unreacted alcohol and a ketone obtained by dehydrogenating said alcohol, and (2) a higher boiling fraction containing the desired higher ketone products containing a number of carbon atoms per molecule equal to the sum of the number present in said alcohol and ketone; continuously recycling said light ends fraction back to the first reaction zone in admixture with the aliphatic alcohol-containing feed stream; and recovering the higher ketones from said higher boiling fraction.

15. The method of claim 14 wherein the alcohol in the feed stream is secondary butyl alcohol.

16. The method of claim 14 wherein the incoming feed stream contains a mixture of isopropyl alcohol and secondary butyl alcohol.

17. The method of claim 14 wherein the incoming feed steam contains an aliphatic alcohol together with an aliphatic ketone.

18. The method of claim 14 wherein the incoming feed stream contains a mixture of secondary butyl alcohol and methyl ethyl ketone.

19. The method of claim 14 wherein the copper-alumina catalyst employed in said second reaction zone is catalyst which has been used in the first said reaction at a pressure above about 175 p. s. i. g. and has lost activity therein.

References Cited in the file of this patent

UNITED STATES PATENTS

| Number | Name | Date |
|---|---|---|
| 2,064,254 | Fuchs et al. | Dec. 15, 1936 |
| 2,066,496 | Taylor | Jan. 15, 1937 |
| 2,087,038 | McMahon | July 13, 1937 |
| 2,492,956 | Ballard et al. | Jan. 3, 1950 |
| 2,560,361 | Morrell et al. | July 10, 1951 |